United States Patent [19] [11] 4,439,170
Steuer [45] Mar. 27, 1984

[54] INFINITELY VARIABLE CONE PULLEY TRANSMISSION

[75] Inventor: Herbert K. Steuer, Bad Homburg, Fed. Rep. of Germany

[73] Assignee: P.I.V. Antrieb Werner Reimers, GmbH & Co. KG, Bad Hamburg, Fed. Rep. of Germany

[21] Appl. No.: 281,924

[22] Filed: Jul. 10, 1981

[30] Foreign Application Priority Data

Jul. 26, 1980 [DE] Fed. Rep. of Germany ....... 3028490

[51] Int. Cl.$^3$ ............................................. F16H 11/04
[52] U.S. Cl. .......................................... 474/28; 474/18
[58] Field of Search ..................... 474/28, 29, 25, 27, 474/18

[56] References Cited

U.S. PATENT DOCUMENTS 4,094,203 6/1978 van Deursen et al. ............... 474/28
4,261,213 4/1981 Rattunde ............................. 474/18
4,292,031 9/1981 Rattunde ............................. 474/18

FOREIGN PATENT DOCUMENTS 2846580 4/1980 Fed. Rep. of Germany.

Primary Examiner—John E. Murtagh
Assistant Examiner—Andrew Joseph Rudy
Attorney, Agent, or Firm—Spencer & Frank

[57] ABSTRACT

An infinitely variable cone pulley transmission has a first and a second pulley mounted on driving and driven shafts and connected by an endless belt. Each pulley is formed of first and second pulley discs. A hydraulic device sets and maintains each first pulley by hydraulic pressure in an axial position corresponding to a desired transmission ratio between the driving and the driven shafts. A torque sensor is mounted adjacent a second pulley disc for receiving a torque. The torque sensor has a pressing device mounted for axial displacement as a function of the torque and a valve arranged for displacement by the pressing device for varying the hydraulic pressure on the first pulley discs. The pressing device has a first ring torque-transmittingly and axially immovably mounted in the vicinity of the second pulley disc, a second ring relatively rotatably and axially slidably mounted between the second pulley disc and the first ring and forming a movable part of the valve. A torque transmitting device transmits torque from one ring to the other. The torque transmitting device comprises a cooperating camming arrangement carried by the two rings for axially displacing the second ring with respect to the first ring as a function of the torque applied to the second ring.

9 Claims, 6 Drawing Figures

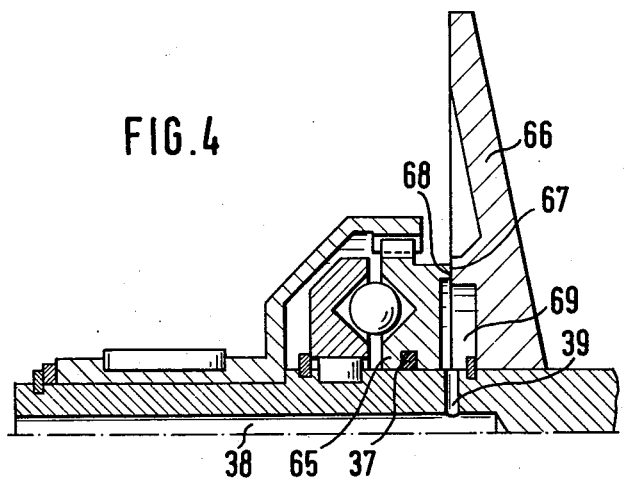
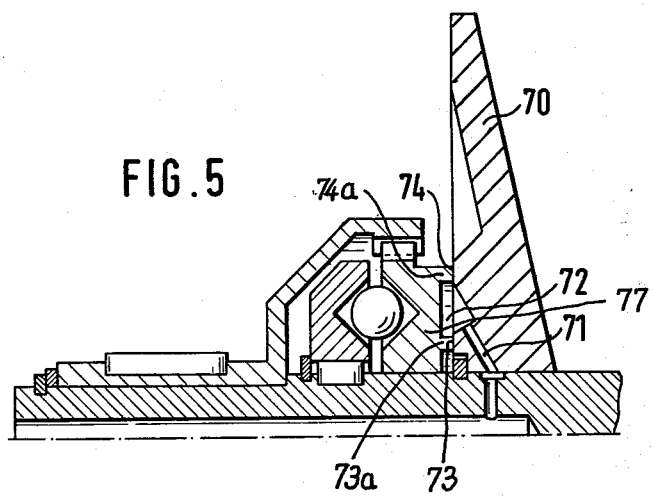
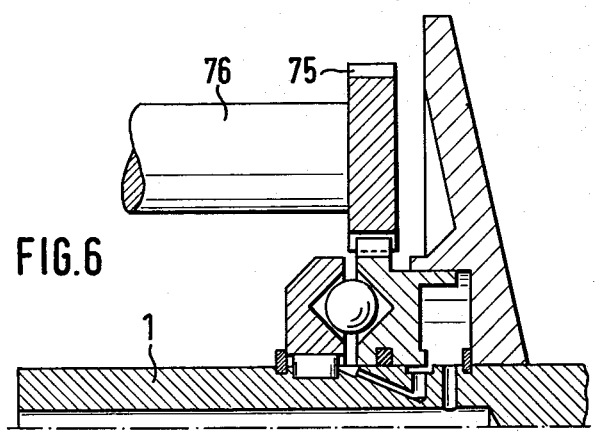

INFINITELY VARIABLE CONE PULLEY TRANSMISSION

BACKGROUND OF THE INVENTION

This invention relates to an infinitely variable cone pulley transmission including two pulleys, one mounted on a driving shaft and the other mounted on a driven shaft which is parallel-spaced from the driving shaft. An endless transmission member, such as a drive belt is trained about the two pulleys. Each pulley is formed of a pair of conical pulley discs, one of which is axially displaceable on its respective shaft and is at least indirectly torque-transmittingly connected therewith. Each such axially displaceable pulley disc forms a power cylinder which rotates in unison with the respective shaft. With the power cylinder there is associated a piston which is affixed to the shaft and to which there is applied pressurized hydraulic fluid for setting and maintaining the transmission ratio by means of a slide valve having four control sections. The slidable control valve is connected, for example, with the intermediary of a setting lever, with one of the axially displaceable pulley discs. The two other pulley discs are axially immovably and torque-transmittingly mounted on the driving and driven shafts. For the load-dependent generation of pressing forces there is provided a sensor on at least one shaft adjacent the fixed pulley disc for sensing the torque transmitted at that location. To the sensor there is admitted hydraulic fluid at a pressure which prevails in the cylinder-and-piston assembly on its own shaft or the other shaft and which is necessary for setting and maintaining the desired transmission ratio. The sensor, by means of a torque-dependent relative motion between two valve components of a valve, generates a torque-dependent hydraulic pressure and determines the required load-dependent hydraulic pressing force. Further, the sensor is formed as a torque-dependent pressing device which operates with face-to-face arranged camming faces and rolling bodies disposed therebetween. The sensor has a first ring which is remote from the fixed pulley disc and which carries one half of the curved pressing faces. The first ring is axially immobilized to the shaft for unison rotation therewith.

Cone pulley transmissions as outlined above are disclosed in German Laid-Open Application (Offenlegungsschrift) No. 2,846,580. The embodiments disclosed therein show—and this equally applies to the invention to be described as the specification progresses—that the torque sensor may be arranged in different ways dependent upon specific requirements demanded of the transmission. The usual case which will be considered in connection with the invention to be described below, without however, limiting the invention thereto, resides in that the torque sensor is mounted on the driving shaft of the transmission and is exposed to the fluid pressure prevailing in the piston-and-cylinder assembly associated with the driven side of the transmission. According to another structural possibility the sensor is mounted on the driven shaft and is exposed to the hydraulic pressure prevailing at the driven side or the sensor is mounted on the driving shaft and is exposed to the hydraulic pressure prevailing at the driving side. Or, it is also feasible to mount a separate torque sensor on each shaft and to expose each torque sensor to the hydraulic pressure associated with its own shaft. In the latter case, however, under the conditions disclosed in the above-noted Laid-Open Application, one of the torque sensors is always idle.

The known torque sensor is in particular so structured that the fixed pulley disc associated therewith constitutes or actuates one of the valve parts for generating the load-dependent pressing force. As a result of such an arrangement, the fixed pulley disc is, transversely to the direction of run of the endless transmission member (drive belt or chain) displaced back and forth corresponding to the amount serving for the valve control. This leads to a corresponding offsetting of the track of the endless transmission member which, dependent upon the mode of application and load of the transmission may be disadvantageous and thus undesirable. Then, the bearing base for the fixed pulley disc also does not have to be as wide as in the known case.

Furthermore, the known torque sensor has a relatively large spatial requirement in the axial direction of the transmission and has numerous individual components.

SUMMARY OF THE INVENTION

It is an object of the invention to provide an improved torque sensor of the above-outlined type which has particularly few individual components and thus has, particularly in the axial direction, a very short structure, rendering it especially adapted for incorporation in vehicle transmissions and further, in which an offsetting of the track does not occur.

This object and others to become apparent as the specification progresses, are accomplished by the invention, according to which, briefly stated, the other half of the camming faces is carried on a second ring which is arranged between the first ring and the fixed pulley disc and further wherein the second ring, together with the shaft or the fixed pulley disc constitutes the valve and further, torque is applied to or taken up from the transmission by means of the second ring.

According to a further feature of the invention, the second ring has gear teeth on its external circumference for purposes of force transmission.

By virtue of the invention the transmission structure is very simple and surprisingly short in the axial direction and further, the fixed pulley disc no longer needs to function as a valve component and, consequently, does not have to shift back and forth as in prior art devices outlined above. By means of the structure according to the invention, there is unexpectedly provided a favorable possibility for force application or force take-up, since the second ring may be situated in the immediate vicinity of the fixed pulley disc. The torque-transmission drive may be effected, for example, by the outer ring gear of a planetary gearing or one part of a clutch. It is, however, also feasible to effect a torque transmission in a non-coaxial arrangement by means of a spur gear supported on a shaft parallel to the driving shaft and the driven shaft. It is also feasible to effect a torque transmission by means of a bell-shaped component supported on the associated shaft wherein such bell-shaped component has, at its frontal end, inner gear teeth which mesh slidably with outer gear teeth provided on the second ring.

It is noted that the torque sensor according to the invention may operate in most cases with only radial seals for the hydraulic fluid; in some instances even radial seals are not needed.

BRIEF DESCRIPTION OF THE DRAWING

FIGS. 2, 3, 4 and 5 are axial sectional views of four additional preferred embodiments of the invention.

FIG. 6 is an axial sectional view of a variant of a drive arrangement shown in FIG. 1.

DESCRIPTION OF THE PREFERRED EMBODIMENTS

Figure 1:
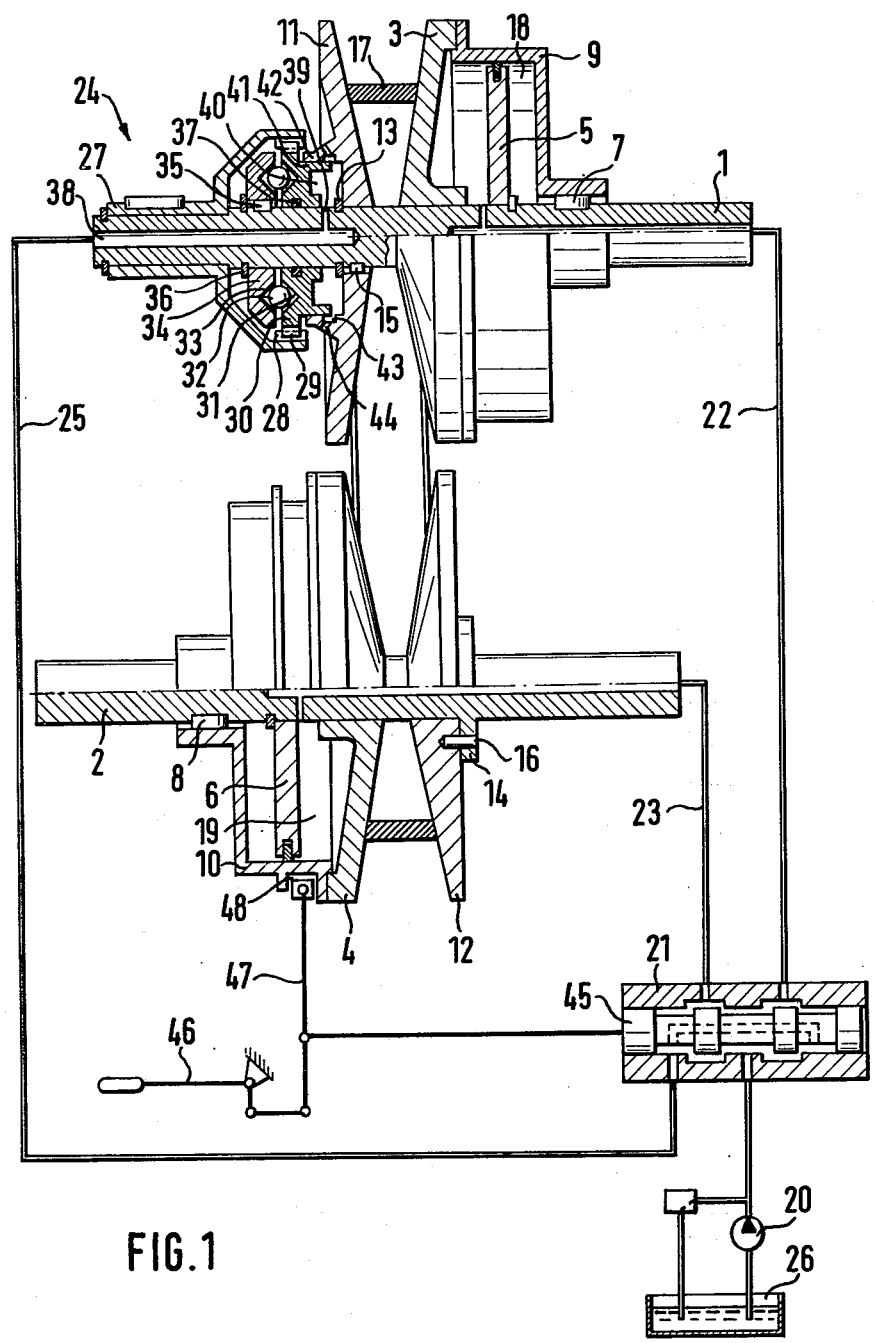
FIG. 1 is a schematic sectional view of a cone pulley transmission, incorporating a preferred embodiment of the invention.

Turning now to FIG. 1, there is shown a generally known, hydraulically controlled, infinitely variable cone pulley transmission comprising a driving shaft 1 and a driven shaft 2. On the driving shaft 1 there is mounted a first transmission pulley formed of conical pulley discs 3 and 11, while on the driven shaft 2 there is mounted a second transmission pulley formed of conical pulley discs 4 and 12. The pulley discs 3 and 4 are provided for setting and maintaining the desired transmission ratio and are axially displaceable. They form piston-and-cylinder assemblies with respective pistons 5 and 6 fixedly mounted on the respective shafts 1 and 2, as well as respective cylinders 9 and 10 which surround the pistons 5 and 6 and which are coupled by means of adjusting springs 7 and 8 with the respective cylinders 9 and 10. The pulley discs 11 and 12 associated with the pulley discs 3 and 4, respectively, are axially affixed to their respective shafts by means of stops 13 and 14 and are torque-transmittingly attached thereto by means of an adjusting spring 15 or pins 16. An endless force-transmitting transmission member, such as a drive belt 17 is trained about the two cone pulleys 3, 11 and 4, 12.

Hydraulic fluid pressurized by a pump 20 is admitted to cylinder chambers 18 and 19 by means of a slide valve 21 having four control edges. From the slide valve 21 the hydraulic fluid is introduced into the cylinder chamber 18 of the cylinder 9 by a conduit 22 and into the cylinder chamber 19 of the cylinder 10 by a conduit 23.

On the driving shaft 1 there is mounted a torque sensor generally indicated at 24 into which a conduit 25 introduces hydraulic fluid from the control valve 21 at a pressure prevailing at the driven side of the transmission. The hydraulic fluid is throttled by the torque sensor 24 in a torque-dependent manner and thus the pressure at the driven side (piston-and-cylinder assembly 6, 10, 19) is determined. From the torque sensor 24 depressurized hydraulic fluid flows in the transmission housing (not shown) and is eventually returned into a sump 26.

Torque is applied to the transmission shaft 1 with the intermediary of the torque sensor 24. For this purpose there is provided a bell-shaped member 27 axially immovably mounted on the shaft 1 and provided with radially inwardly oriented gear teeth 28. Outer gear teeth 29 of a ring 30 forming part of a pressing device mesh with the inner teeth 28 of the bell-shaped member 27. The ring 30 is torque-transmittingly connected to a ring 34 by means of balls 32, each nested in V-shaped pockets 31 of the ring 30 and V-shaped pockets 33 of the ring 34. The ring 34 is mounted on the shaft 1 by means of an adjusting spring 35 for rotation with the shaft 1 and is limited in its axial displacement with respect to the shaft 1 by means of a stop 36 held in the shaft 1. The ring 30 is, by means of a radially inwardly positioned seal 37 mounted fluid-tight on the shaft 1 and is axially displaceable and rotatable relative thereto.

The hydraulic fluid, at a pressure prevailing on the driven side of the transmission, is introduced into a cylinder chamber 40 by means of the conduit 25 and an axial bore 38 as well as a radial bore 39, both provided in the shaft 1. The cylinder chamber 40 is formed, on the one hand, by a collar 41 which forms part of the ring 30 and which is oriented towards the fixed pulley disc 11 and a cylinder shell 42 which forms part of the pulley disc 11 and which surrounds the collar 41. The edge face of the collar 41 forms, together with a circumferential annular groove 43 in the cylinder shell 42, the opening of a valve formed by the torque sensor 24. Thus, hydraulic fluid can flow out of the cylinder chamber 40 through the annular groove 43 and ports 44 provided in the cylinder shell 42.

In the description which follows, the generally conventional operation of the above-described transmission will be briefly set forth.

The hydraulic fluid pressurized by the pump 20 is introduced into the control slide valve 21 from which the fluid is admitted to the driving and driven sides of the transmission by conduits 22 and 23, respectively. The plunger 45 of the control slide valve 21 is mechanically connected with a setting lever 46 and a rocker lever 47 which, with its free end, extends into a circumferential groove 48 of the pulley disc 4 and thus directly senses the transmission ratio setting.

In accordance with a known mathematical relationship in belt-type cone pulley transmissions, the fluid pressure required for an equilibrium position of the transmission is higher at the driving side than the fluid pressure at the driven side. For this reason, as it may be observed in FIG. 1, the plunger 45 has a position which is slightly to the right of its middle position, so that from the pump 20 more fluid, that is, a higher fluid pressure is made available for the driving side of the transmission than for the driven side. The hydraulic fluid flowing in the return conduit 25 extending from the control valve 21 has the same pressure as prevails at the driven side of the transmission.

If now, for example, an increased torque load is applied to the transmission, the torque sensor 24 seeks to move the two rings 30 and 34 away from one another which results in the displacement of the ring 30 slightly towards the right. As a result, the flow of the hydraulic fluid—which is at a pressure prevailing at the driven side—through the annular groove 43 and the ports 44 is throttled to a greater extent, so that hydraulic fluid return is reduced and, as a result the hydraulic pressure increases at the driven side.

The fluid pressure increase at the driven side leads to a shift of the pulley disc 4 towards the right; this shift counteracts exactly the displacement of the pulley disc 4 towards the left under an increased torque, whereby the last-named displacement occurs in accordance with the above-noted mathematical relationship, according to which the pressing forces on the driving side and also the spreading forces exerted by the belt 17 are higher than those on the driven side and, upon increase of the torque, they have a predominant effect, inasmuch as the belt 17, as the torque increases, seeks to assume a larger running radius at the driving side and a smaller running radius at the driven side.

FIGS. 2 through 6 illustrate different variants of the torque sensor 24 and the arrangement by which external torque is applied to the driving shaft 1.

Figure 2:
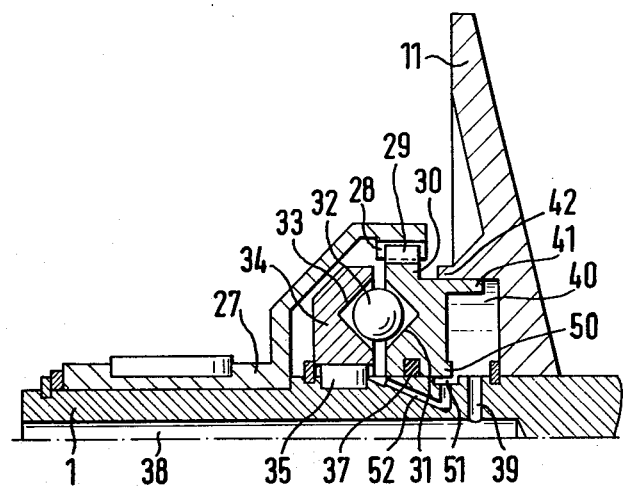

Turning now to FIG. 2, the throttling of the hydraulic fluid having a pressure which prevails at the driven side is effected by an inner edge 50 forming part of the ring 30 and oriented towards the fixed pulley disc 11, in cooperation with an annular circumferential groove 51 of the shaft 1. Ports 52, also provided in the shaft 1, communicate with the groove 51 and open into the clearance between the rings 30 and 34. In this manner a lubrication of the pressing device as well as the gear teeth 28 and 29 is effected.

Figure 3:
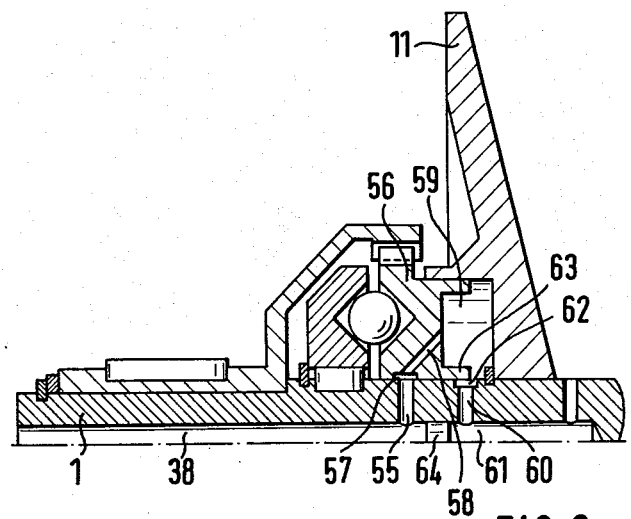

In the embodiment illustrated in FIG. 3 the hydraulic fluid flows from the axial shaft channel 38 through radial bores 55 which communicate with an annular groove 57 and bores 58 of the ring 56. The bores 58 open into the cylinder chamber 59 between the pulley disc 11 and the ring 56. From the cylinder chamber 59 the hydraulic fluid flows through shaft ports 60 and 61 into the space between the pulley discs 11 and 3 supported on the shaft 1. The throttling is effected at the ports 60 and the annular groove 62 communicating therewith at their upstream end, with the aid of the inner control edge 63 of the ring 56. The axial bores 38 and 61 extending in the shaft 1 are separated from one another by a plug 64.

In the embodiment illustrated in FIG. 4, between the ring 65 and the pulley disc 66 a plate valve is formed by an end face 68 of a collar forming part of the ring 65 and an end face 67 which forms part of a collar of the pulley disc 66 and which cooperates with the end face 68. The width of the clearance between the faces 67 and 68 depends, on the one hand, from the torque to be transmitted and, on the other hand, from the hydraulic pressure prevailing in the cylinder chamber 69 (that is, the hydraulic pressure prevailing at the driven side).

In the embodiment illustrated in FIG. 5 which is a variant of that shown in FIG. 4, the pressurized hydraulic fluid flows into the fixed pulley disc 70 and transversely thereto in substantially radially oriented bores 71. The hydraulic fluid is then introduced into a cylinder chamber 72 which is bounded inwardly by an end face 73 engaging the pulley disc 70 and outwardly by an end face 74 engaging the pulley disc 70, whereby the outer end face 74 forms a throttle valve from which the pressurized hydraulic fluid may flow into the transmission housing. The end face 73 forms part of a radially inner collar 73a of the ring 77, while the end face 74 forms part of a radially outer collar 74a of the ring 77.

It is to be noted particularly in connection with the embodiment illustrated in FIG. 5 that no seals of any kind are required as separate components; this embodiment is thus particularly economical from the point of view of structural simplicity and maintenance.

Turning now to FIG. 6, in the embodiment shown therein which is a variant of the embodiment illustrated in FIG. 2, the drive (that is, the application of torque) is effected by a spur gear 75 (instead of a bell member 27 of FIG. 2) which is mounted on a shaft 76 that extends parallel to the shaft 1.

It will be understood that the above description of the present invention is susceptible to various modifications, changes and adaptations, and the same are intended to be comprehended within the meaning and range of equivalents of the appended claims.

What is claimed is:

1. In an infinitely variable cone pulley transmission including a driving shaft and a driven shaft, a first and a second pulley mounted on said driving and driven shafts, respectively, an endless transmission member trained about said pulleys for transmitting driving torque from said driving shaft to said driven shaft; each pulley being formed of first and second pulley discs; each said first pulley disc being torque-transmittingly and axially slidably mounted on the respective said shaft; hydraulic means for setting and maintaining each said first pulley disc by hydraulic pressure in an axial position corresponding to a desired transmission ratio between the driving and the driven shafts; each said second pulley disc being torque-transmittingly and axially immovably mounted on the respective said shaft; a torque sensor mounted on at least one of said shafts adjacent a said second pulley disc for receiving and transmitting a torque; said torque sensor including pressing means mounted for axial displacement as a function of said torque and for generating load-dependent pressing forces; a first ring forming part of said pressing means and being torque-transmittingly and axially immovably mounted on the shaft carrying the torque sensor; torque transmitting means for transmitting torque from one said ring to the other; said torque transmitting means comprising cooperating first and second camming surfaces oriented towards one another; roller members in engagement with the camming surfaces for transmitting forces from one camming surface to the other; said first camming surface being carried by said first ring; and load-dependent valving means arranged for displacement by said pressing means for varying said hydraulic pressure; the improvement wherein said shaft carrying the torque sensor is a one-piece shaft; the improvement further comprising a second ring forming part of said pressing means and being relatively rotatably and axially slidably mounted on the shaft carrying the torque sensor; said second ring being situated between said second pulley disc and said first ring and forming a movable part of said valving means; said second camming surface being provided on said second ring, whereby said second ring is axially displaceable with respect to said first ring as a function of a torque applied to said second ring; and means operatively coupled with said second ring for introducing said torque into or taking said torque out of said transmission with the intermediary of said second ring.

2. A cone pulley transmission as defined in claim 10, wherein said first and second camming surfaces comprise, respectively,
   first pockets provided in an end face forming part of said first ring and oriented towards said second ring; and second pockets provided in an end face forming part of said second ring and oriented towards said first ring; each of said roller members being received, at opposite sides thereof, by a said first pocket and a said second pocket.

3. A cone pulley transmission as defined in claim 1, wherein said second ring comprises external gear teeth provided about a circumference of said second ring for transmitting said torque.

4. A cone pulley transmission as defined in claim 1, further wherein said second ring has a first collar oriented towards said second pulley disc and said second pulley disc has a second collar oriented towards said second ring; said first and second collars being telescopingly arranged within one another and defining, together with further portions of said second ring and said second pulley disc, a pressure chamber; further wherein said shaft carrying said torque sensor has an axial channel and a radial port maintaining communication between said channel and said pressure chamber; said hydraulic pressure being communicated to said pressure chamber by said channel and said radial port; said valving means further comprising a valve opening communicating with said pressure chamber to release pressure therefrom; said movable part of said valving means cooperating with said valve opening for varying a flow passage area thereof.

5. A cone pulley transmission as defined in claim 4, wherein said first collar has an outer edge forming said movable part of said valving means, said valve opening comprising a circumferential annular groove provided in said second collar and a port provided in said second collar for maintaining communication between said groove and the ambient atmosphere externally of said pressure chamber; said outer edge of said first collar cooperating with said groove for varying the flow passage area thereof.

6. A cone pulley transmission as defined in claim 4, wherein said valve opening comprises a circumferential annular groove provided in said shaft carrying said torque sensor and a port provided in said shaft carrying said torque sensor for maintaining communication between said groove and a space between said first and second ring; said second ring having a control edge forming said movable part of said valving means and cooperating with said groove for varying the flow passage area thereof.

7. A cone pulley transmission as defined in claim 4, wherein said second ring has an inner cylindrical face being in sliding contact with an outer cylindrical face of said shaft carrying said torque sensor; a first annular circumferential groove provided in said inner cylindrical face of said second ring and being in communication with said radial port; a further port provided in said second ring for communicating with said pressure chamber and said first annular circumferential groove, whereby said radial port communicates with said pressure chamber with the intermediary of said first annular circumferential groove and said further port provided in said second ring; further wherein said valve opening comprises a second annular circumferential groove provided in said outer cylindrical face of said shaft carrying said torque sensor in the zone of said pressure chamber and further ports provided in said shaft carrying said torque sensor for maintaining communication between said second groove and the ambient atmosphere externally of said pressure chamber; said movable part of said valving means being formed of a control edge provided on said second ring and cooperating with said second groove for varying the flow passage area thereof.

8. A cone pulley transmission as defined in claim 1, further wherein said second ring has a collar oriented towards said second pulley disc and having an edge face cooperating with an annular counterface on said second pulley disc; said edge face forming said movable part of said valving means; said edge face and said counterface together defining a variable valve opening; said collar and further parts of said second ring and said second pulley disc define a pressure chamber; further wherein said shaft carrying said torque sensor has an axial channel and a radial port maintaining commuication between said channel and said pressure chamber; said hydraulic pressure being communicated to said pressure chamber by said channel and said radial port; said variable valve opening releasing pressure from said pressure chamber.

9. A cone pulley transmission as defined in claim 8, wherein said collar is a first collar; said second ring has a second collar oriented towards said second pulley disc and disposed radially inwardly of said first collar; said second collar having an edge face being coplanar with the edge face of the first collar and cooperating with an annular counterface provided on said second disc pulley and being coplanar with the counterface cooperating with the edge face of the first collar; said pressure chamber being situated between said first and second collars; further comprising a further port in said second pulley disc for connecting said radial port with said pressure chamber.

* * * * *

UNITED STATES PATENT AND TRADEMARK OFFICE
CERTIFICATE OF CORRECTION

PATENT NO. : 4,439,170

DATED : March 27, 1984

INVENTOR(S) : Herbert Karl Steuer

It is certified that error appears in the above-identified patent and that said Letters Patent is hereby corrected as shown below:

In the heading of the patent, under [73] the town of the assignee should be --Bad Homburg--.

Signed and Sealed this

Twenty-eighth Day of August 1984

[SEAL]

Attest:

GERALD J. MOSSINGHOFF

Attesting Officer

Commissioner of Patents and Trademarks